United States Patent
Kanoria

(10) Patent No.: US 10,636,237 B2
(45) Date of Patent: Apr. 28, 2020

(54) SYSTEM AND METHOD FOR PREVENTING PILFERAGE AND TAMPERING OF A LOCK FROM A VEHICLE

(71) Applicant: Sujit Kanoria, New Delhi (IN)

(72) Inventor: Sujit Kanoria, New Delhi (IN)

( * ) Notice: Subject to any disclaimer, the term of this patent is extended or adjusted under 35 U.S.C. 154(b) by 0 days.

(21) Appl. No.: 16/322,211

(22) PCT Filed: Aug. 3, 2017

(86) PCT No.: PCT/IN2017/050322
§ 371 (c)(1),
(2) Date: Jan. 31, 2019

(87) PCT Pub. No.: WO2018/025279
PCT Pub. Date: Feb. 8, 2018

(65) Prior Publication Data
US 2019/0188940 A1 Jun. 20, 2019

(30) Foreign Application Priority Data
Aug. 3, 2016 (IN) .............................. 201611026561

(51) Int. Cl.
*G07C 9/00* (2020.01)
*B60R 25/24* (2013.01)
(Continued)

(52) U.S. Cl.
CPC ........ *G07C 9/00896* (2013.01); *B60R 25/102* (2013.01); *B60R 25/24* (2013.01);
(Continued)

(58) Field of Classification Search
None
See application file for complete search history.

(56) References Cited

U.S. PATENT DOCUMENTS 4,609,780 A * 9/1986 Clark ................. G07C 9/00023
                                                                379/102.06
5,280,518 A * 1/1994 Danler ..................... G07C 1/32
                                                                  340/5.23
(Continued)

FOREIGN PATENT DOCUMENTS

IN    2015-03249 A1   4/2017
WO    2015154102 A1   10/2015

OTHER PUBLICATIONS

International Search Report dated Sep. 13, 2017 by the Indian Patent Office (Authorized Officer—Subhash Kumar Singh).

*Primary Examiner* — Chico A Foxx
(74) *Attorney, Agent, or Firm* — Hunton Andrews Kurth LLP

(57) ABSTRACT

An embodiment herein provides a system for preventing pilferage and tampering of a lock from a vehicle 112. The system includes at least one electromechanical padlock (EMPL) 116, a secure key housing 114, a tunnel transport layer security (TTLS) application server 108. The at least EMPL 116 is adapted to attach to a container of a vehicle 112 to lock or unlock the container of the vehicle 112. The secure key housing 114 includes at least one key to lock or unlock the at least one EMPL 116. The TTLS application server 108 generates unique codes for operating the at least one key corresponding to the at least one EMPL 116. The TTLS application server 108 generates a onetime password and communicates the onetime password to a computing device 104 of the authorized personnel 102 when the vehicle 112 reaches the receiving office.

9 Claims, 6 Drawing Sheets

(51) Int. Cl.
*G06Q 50/30* (2012.01)
*G06Q 10/08* (2012.01)
*B60R 25/102* (2013.01)

(52) U.S. Cl.
CPC ............ *G06Q 10/08* (2013.01); *G06Q 50/30* (2013.01); *G07C 9/00817* (2013.01); *G07C 9/00571* (2013.01); *G07C 2009/0092* (2013.01); *G07C 2009/00825* (2013.01)

(56) References Cited

U.S. PATENT DOCUMENTS

| | | | | |
|---|---|---|---|---|
| 5,373,282 A | * | 12/1994 | Carter | B60R 25/102 235/382 |
| 5,563,579 A | * | 10/1996 | Carter | B60R 25/102 235/382 |
| 6,065,314 A | * | 5/2000 | Nicholson | E05B 67/383 292/218 |
| 6,323,782 B1 | * | 11/2001 | Stephens | G07C 9/00103 340/10.31 |
| 6,330,816 B1 | * | 12/2001 | O'Connor | E05B 19/0005 109/50 |
| 6,737,961 B2 | * | 5/2004 | Flick | G07C 9/00166 340/426.35 |
| 6,975,202 B1 | * | 12/2005 | Rodriguez | G07C 9/00103 340/10.1 |
| 8,437,740 B2 | * | 5/2013 | Despain | A47G 29/10 340/5.73 |
| 8,786,400 B2 | * | 7/2014 | Harkins | G07C 9/00103 340/5.2 |
| 8,797,138 B2 | * | 8/2014 | Myers | G07C 9/00571 340/5.7 |
| 9,841,743 B2 | * | 12/2017 | Davis | G05B 19/02 |
| 2001/0015691 A1 | * | 8/2001 | Mellen | G07C 9/00182 340/5.2 |
| 2001/0045449 A1 | * | 11/2001 | Shannon | A47G 29/141 232/19 |
| 2003/0231102 A1 | * | 12/2003 | Fisher | G07C 9/00103 340/5.73 |
| 2004/0075530 A1 | * | 4/2004 | Ghabra | B60R 25/24 340/5.6 |
| 2004/0103287 A1 | * | 5/2004 | Newby | G07C 9/00023 713/184 |
| 2005/0110609 A1 | * | 5/2005 | Mosgrove | E05B 19/0005 340/5.72 |
| 2007/0018787 A1 | * | 1/2007 | Martinez de Velasco Cortina | G07C 9/00103 340/5.61 |
| 2007/0159297 A1 | * | 7/2007 | Paulk | B60R 25/104 340/5.73 |
| 2010/0073130 A1 | * | 3/2010 | Tsuruta | B60R 25/24 340/5.8 |
| 2011/0289123 A1 | * | 11/2011 | Denison | G07C 9/00571 707/812 |
| 2012/0188104 A1 | | 7/2012 | Choi | |
| 2013/0332736 A1 | * | 12/2013 | Kawamura | H04L 9/0869 713/171 |
| 2014/0120905 A1 | * | 5/2014 | Kim | H04W 12/06 455/426.1 |
| 2014/0305352 A1 | * | 10/2014 | Dowling | G07C 9/00031 109/38 |
| 2015/0175085 A1 | * | 6/2015 | Raley | B60R 3/00 224/519 |
| 2015/0287256 A1 | * | 10/2015 | Davis | G05B 19/02 340/5.25 |
| 2016/0298363 A1 | * | 10/2016 | Lush | E05B 19/0005 |
| 2017/0256111 A1 | * | 9/2017 | Chung | G07C 9/00309 |
| 2018/0308045 A1 | * | 10/2018 | Arena | G06Q 10/0832 |

* cited by examiner

SYSTEM AND METHOD FOR PREVENTING PILFERAGE AND TAMPERING OF A LOCK FROM A VEHICLE

BACKGROUND

Technical Field

The embodiments herein generally relate to a secure locking mechanism for vehicles, and more particularly, to a system and method for preventing tampering of lock from a vehicle.

Description of the Related Art

Intermodal security is a major concern for all businesses that need to ship material goods via truck and rail. Industry experts estimate all cargo theft adds up to $30 billion each year. Besides thieves who break into random cargo containers, there have been instances where the driver responsible for the cargo is directly involved in the robbery. Locking devices and technologies currently available in the market limit themselves to physically locking the containers. Most of these products are one-time and use products or require a physical key or combination for operation. In case of locking devices with a physical key or combination, there is a no record of when the lock has been operated. This situation can be used to the advantage of drivers, who often control the combination or key, with criminal intent who can tamper with the goods on board.

Presently, there is an increase in the incidence of tanker drivers pilfering and even adulterating petrol and diesel during their journeys, and this is one of the biggest problems of Oil Companies such as IOCL, HPCL, etc. As per a study conducted by Deccan Herald, every oil tanker loses an average of 60 liters on account of pilferage, which accounts to a substantial loss estimate for the oil companies. The companies have tried several means to stop pilferage using few techniques. One technique is replacing normal locks with dynamic locks. The dynamic locks included keys that were non-replicable. A computer-aided lathe machine had to be used to duplicate a key. But over the years, new techniques are evolved to duplicate the key. Another technique involves using a device with GPS tracking of vehicles to check for unscheduled stoppage and route diversion. But, this solution in isolation has not been very successful. The biggest disadvantage in above technique is the lack of accountability in the event of theft. These devices offer no assistance in determining when and where the intrusion might have occurred.

Therefore, there is a need for a system and method for preventing pilferage and tampering of lock in a tanker vehicle.

SUMMARY

In view of the foregoing, an embodiment herein provides a system for preventing pilferage and tampering of a lock from a vehicle, comprising:
(a) at least one electromechanical padlock (EMPL) that is adapted to attach to a container of a vehicle to lock or unlock the container of the vehicle;
(b) a secure key housing that comprises at least one key to lock or unlock the at least one electromechanical padlock, wherein the secure key housing is mounted on a crew cabin of the vehicle, wherein the secure key housing comprises an electromagnetic lock that locks or unlocks the secure key housing;
(c) a tunnel transport layer security (TTLS) application server that is communicatively coupled to the secure key housing, wherein TTLS application server comprises
a memory that comprises a database, wherein the database stores information about the at least one EMPL and the at least one key corresponding to the at least one EMPL, wherein the further stores vehicle information that comprises a destination of the vehicle, an authorized route at which the vehicle needs to travel to reach the destination, a time period within which the vehicle needs to reach the destination and details of authorized personnel of a receiving office at the destination; and
a processor that is configured to
generate unique codes for operating the at least one key corresponding to the at least one EMPL;
generate a onetime password and communicate the onetime password to a computing device of the authorized personnel when the vehicle reaches the receiving office;
receive the onetime password from the computing device to confirm an authenticity of a presence of the vehicle at the receiving office;
communicate the generated unique codes to the secure key housing to operate the at least one key when the presence of the vehicle at the receiving office is authenticated using the received onetime password; and
generate alarms to the authorized personnel at the receiving office when (a) the authorized route at which the vehicle needs to travel to reach the destination, (b) the time period within which the vehicle needs to reach the destination and (c) an unauthorized user handles, locks or unlocks the at least one EMPL.

In an embodiment, the TTLS application server is configured to communicate the unique codes to the secure key housing to unlock the at least one EMPL on a time to live basis or on a basis of a pre-defined number of unlocking operations of the at least one EMPL.

In another embodiment, the at least one key is programmed using a wall programming device (WPD) that is installed inside the secure key housing when a group of EMPL's and a group of keys are authorized.

In yet another embodiment, the TTLS application server is configured to communicate the unique codes for locking and unlocking of the at least one EMPL in an emergency situation based on (a) the destination of the vehicle, (b) the time period within which the vehicle needs to reach the destination, (c) the authorized route at which the vehicle needs to travel to reach the destination and (d) the onetime password to unlock the at least one EMPL lock for the vehicle over-ridden through a permission based workflow.

In yet another embodiment, the at least one EMPL and the at least one key comprise an embedded clock function to synchronize events selected from at least one of unauthorized handling, unlocking or locking of the at least one EMPL with the TTLS application server. The TTLS application server synchronizes the events using a Network Time Protocol (NTP) of a central time server.

In yet another embodiment, the TTLS application server is configured to monitor the events associated with the at least one EMPL and the at least one key.

In yet another embodiment, the at least one key in the secure key housing are dynamically programmed during at least one of emergency situations or exception handling scenarios.

In an aspect, a method for preventing pilferage and tampering of a lock from a vehicle, comprising:

storing, using a database, information about at least one EMPL and at least one key corresponding to the at least one EMPL, wherein the database further stores vehicle information comprises a destination of the vehicle, an authorized route at which the vehicle needs to travel to reach the destination, a time period within which the vehicle needs to reach the destination and details of authorized personnel of a receiving office at the destination;

generating, using tunnel transport layer security (TTLS) application server, unique codes for operating the at least one key corresponding to the at least one EMPL;

generating, using the TTLS application server, a onetime password and communicating the onetime password to a computing device of the authorized personnel when the vehicle reaches the receiving office;

receiving, using the TTLS application server, the onetime password from the computing device to confirm an authenticity of a presence of the vehicle at the receiving office;

communicating, using the TTLS application server, the generated unique codes to the secure key housing to operate the at least one key when the presence of the vehicle 112 at the receiving office is authenticated using the received onetime password; and generating, using the TTLS application server, alarms to the authorized personnel at the receiving office when (a) the authorized route at which the vehicle needs to travel to reach the destination, (b) the time period within which the vehicle needs to reach the destination and (c) an unauthorized user handles, locks or unlocks the at least one EMPL.

In an embodiment, the method includes a step of communicating, using the TTLS application server, the unique codes for locking and unlocking of the at least one EMPL in an emergency situation based on (a) the destination of the vehicle, (b) the time period within which the vehicle needs to reach the destination, (c) the authorized route at which the vehicle needs to travel to reach the destination and (c) the onetime password to unlock the at least one EMPL for the vehicle over-ridden through a permission based workflow.

In another embodiment, the at least one EMPL and the at least one key comprise an embedded clock function to synchronize events selected from at least one of unauthorized handling, unlocking or locking of the at least one EMPL with the TTLS application server. The TTLS application server synchronizes the events using a Network Time Protocol (NTP) of a central time server.

In yet another embodiment, the method includes a step of monitoring, using the TTLS application server, the events associated with the at least one EMPL and the at least one key.

The system prevents pilferage and tampering of a lock from a vehicle. The system is also used to provide more security in the container of the vehicle that carries the precious materials with the help of electromechanical padlocks. The system is used to generate and provide alarms when unauthorized person handles, locks or unlocks the container of the vehicle so finding theft is easy for receiving office personnel. The system manages the vehicle through automation whenever applicable.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
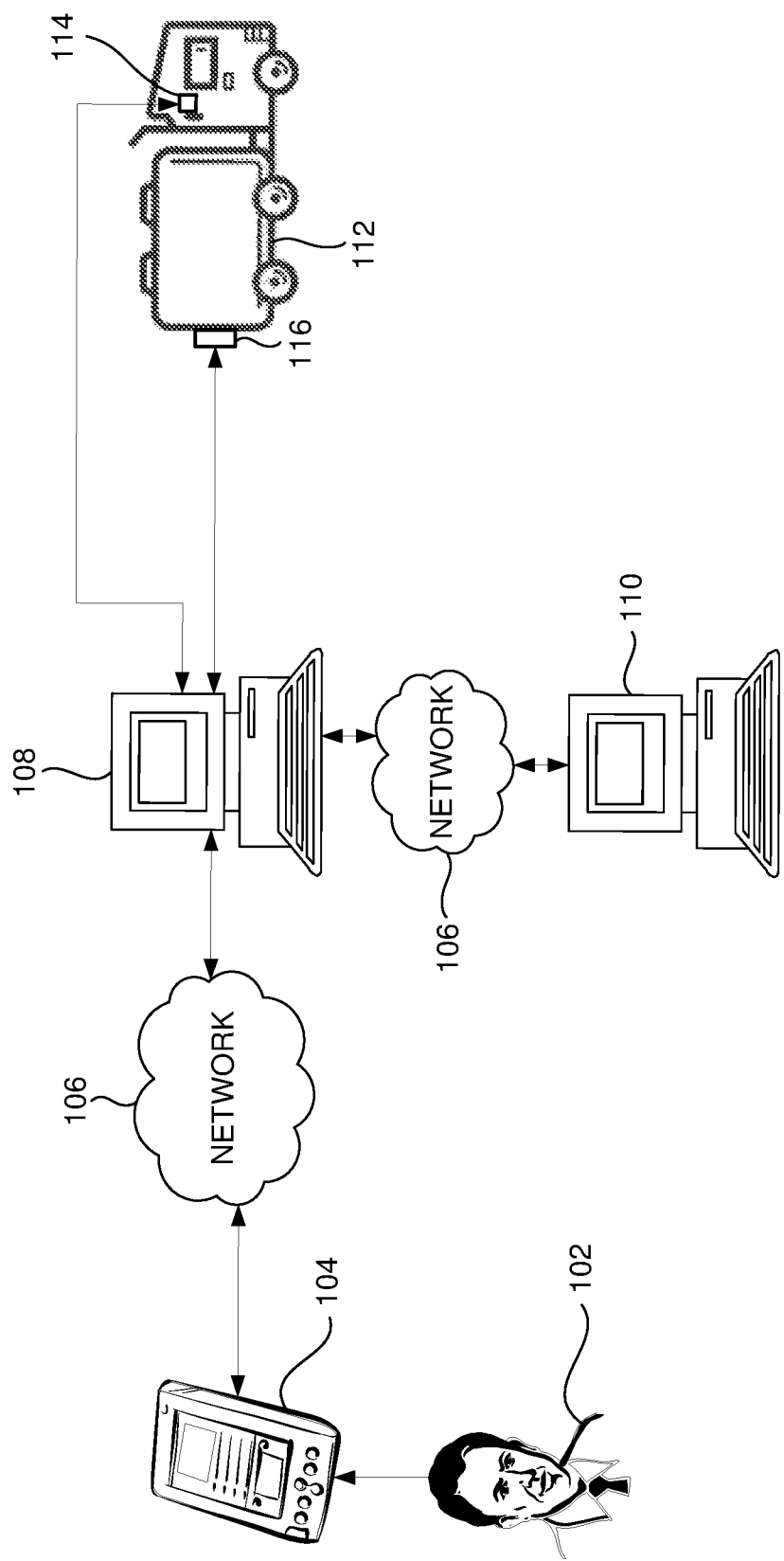
FIG. 1 illustrates a system view of a system that prevents pilferage and tampering of a lock from a vehicle using a tunnel transport (TTLS) application server according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for preventing pilferage and tampering of lock in a container of a vehicle. Referring now to the drawings, and more particularly to FIGS. 1 through 6, where similar reference characters denote corresponding features consistently throughout the figures, preferred embodiments are shown.

FIG. 1 illustrates a system view of a system that prevents pilferage and tampering of a lock from a vehicle 112 using a tunnel transport (TTLS) application server 108 according to an embodiment herein. The system includes an authorized personnel (a user) 102, a computing device 104, a network 106, the TTLS application server 108, a central time server 110, a vehicle (e.g. tanker truck) 112, a secure key housing 114 and at least one electromechanical padlock (EMPL) 116. The at least one electromechanical padlock (EMPL) 116 is adapted to attach to a container of a vehicle 112 to lock or unlock the container of the vehicle 112. The secure key housing 114 includes at least one key to lock or unlock the at least one electromechanical padlock 116. In an embodiment, the secure key housing 114 is mounted on a crew cabin of the vehicle 112. The secure key housing 114 includes an electromagnetic lock that locks or unlocks the secure key housing 114. The TTLS application server 108 is communicatively coupled to the secure key housing 114 through the network 106 to lock and unlock the at least one EMPL 116. In one embodiment, the network 106 is a wireless network, a local area network (LAN), a wide area network (WAN) etc. The TTLS application server 108 may be a computer, a mobile phone, a PDA (Personal Digital Assistant), a tablet, an electronic notebook or a Smartphone. In an embodiment, the secure key housing 114 includes networking devices selected from at least one of (a) a transmitter, (b) a receiver or (c) a global positioning system (GPS) for communicating with the TTLS application server 108. In an embodiment, the at least one EMPL 116 and the at least one key comprise an embedded clock function to synchronize events selected from at least one of unauthorized handling, unlocking or locking of the at least one EMPL 116 with the TTLS application server 108.

The TTLS application server synchronizes the events using a Network Time Protocol (NTP) of a central time server 110. In an embodiment, the TTLS application server 108 monitors the events associated with the at least one EMPL 116 and the at least one key. In an embodiment, the TTLS application server 108 monitors over a speed of the vehicle 112, stoppage of the vehicle 112 in an unspecified place and time bound activation. The central time server 110 may be communicatively coupled to the TTLS application server 108 through the network 106. The at least one key in the secure key housing 114 are dynamically programmed during at least one of emergency situations or exception handling scenarios. In an embodiment, the at least one key is programmed at a data center or a programming device at the receiving office. In an embodiment, the at least one key, the at least one EMPL 116 and the secure key housing are suitable for an outdoor use with IP65 ratings. In an embodiment, the computing device 104 is communicatively coupled to the TTLS application server 108 through the network 106.

Figure 2:
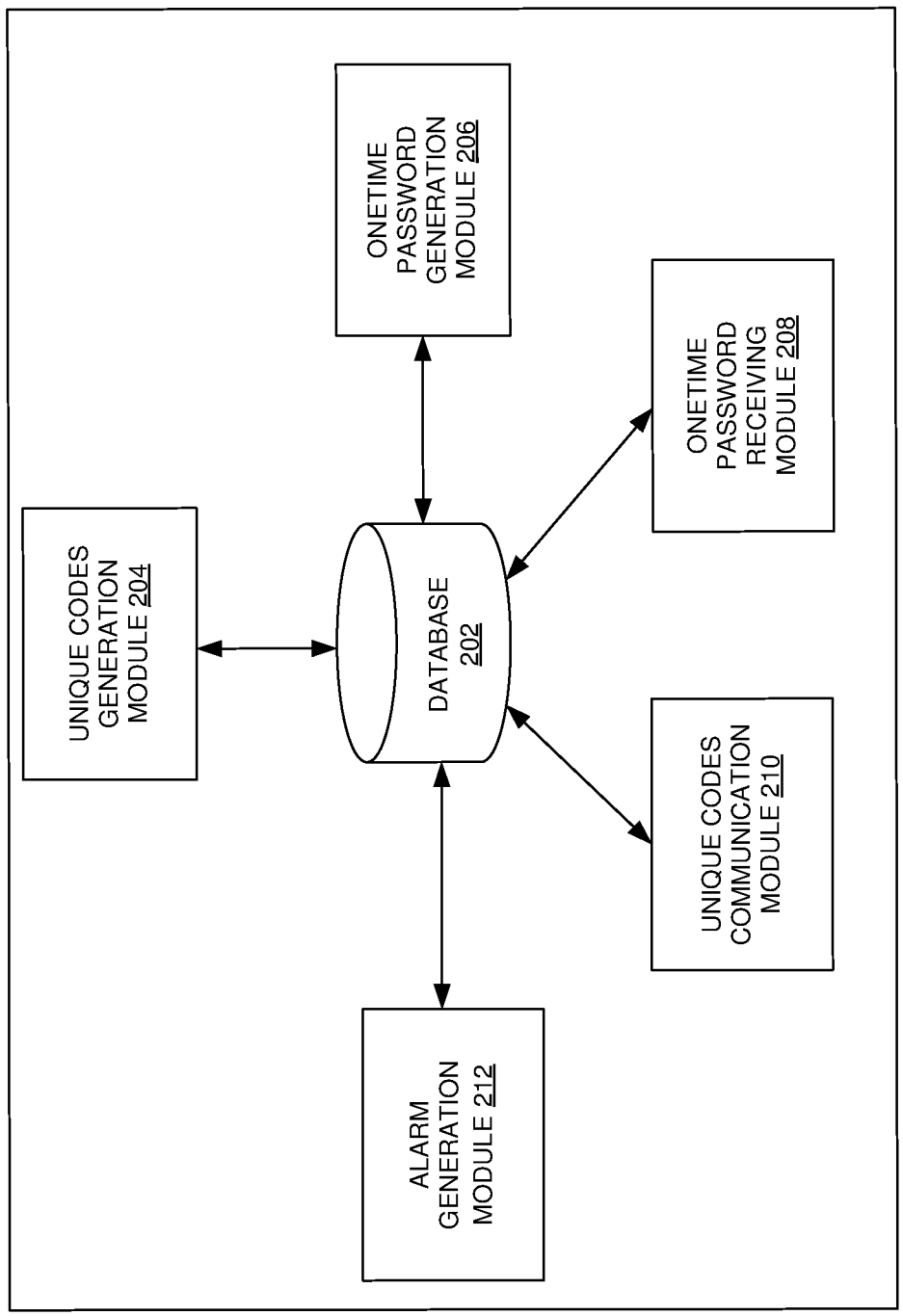
FIG. 2 illustrates an exploded view of the TTLS application server of FIG. 1 according to an embodiment herein.

FIG. 2 illustrates an exploded view of the TTLS application server 108 of FIG. 1 according to an embodiment herein. The TTLS application server 108 includes a database 202, a unique codes generation module 204, a onetime password generation module 206, a onetime password receiving module 208, a unique codes communication module 210 and an alarm generation module 212. The TTLS application server 108 may comprise a processor that executes above said modules. The database 202 stores information about the at least one EMPL 116 and the at least one key corresponding to the at least one EMPL 116. The database 202 further stores vehicle information that includes a destination of the vehicle 112, an authorized route at which the vehicle 112 needs to travel to reach the destination, a time period within which the vehicle 112 needs to reach the destination and details of authorized personnel 102 of the receiving office at the destination. The unique codes generation module 204 generates unique codes for operating the at least one key corresponding to the at least one EMPL 116. In an embodiment, the at least one key is programmed using a wall programming device (WPD) that is installed inside the secure key housing 114 when a group of EMPL's 116 and a group of keys are authorized.

The onetime password generation module 206 generates a onetime password and communicates the onetime password to a computing device 104 of the authorized personnel 102 when the vehicle 112 reaches the receiving office. The onetime password receiving module 208 receives the onetime password from the computing device 104 to confirm an authenticity of a presence of the vehicle 112 at the receiving office. The computing device 104 may be a computer, a mobile phone, a kindle, a PDA (Personal Digital Assistant), a tablet, a music player, an electronic notebook or a Smartphone. The unique codes communication module 210 communicates the generated unique codes to the secure key housing 114 to operate the at least one key when the presence of the vehicle 112 at the receiving office is authenticated using the received onetime password. In an embodiment, the unique codes communication module 210 communicates the unique codes to the secure key housing 114 to operate on a time to live basis or on a basis of a pre-defined number of unlocking operations of the at least one EMPL 116. In another embodiment, the unique codes communication module 210 communicates the unique codes for locking and unlocking of the at least one EMPL 116 during an emergency situation based on (a) a destination of the vehicle 112, (b) a time period within which the vehicle 112 needs to reach the destination, (c) an authorized route at which the vehicle 112 needs to travel to reach the destination and (c) the onetime password to unlock the at least one EMPL 116 for the vehicle 112 over-ridden through a permission based workflow. The alarm generation module 212 generates alarms to the authorized personnel 102 at the receiving office when (a) the vehicle 112 is deviated from the authorized route, (b) the vehicle 112 fails to reach the destination within the time period and (c) an unauthorized user handles, locks or unlocks the at least one EMPL 116.

Figure 3:
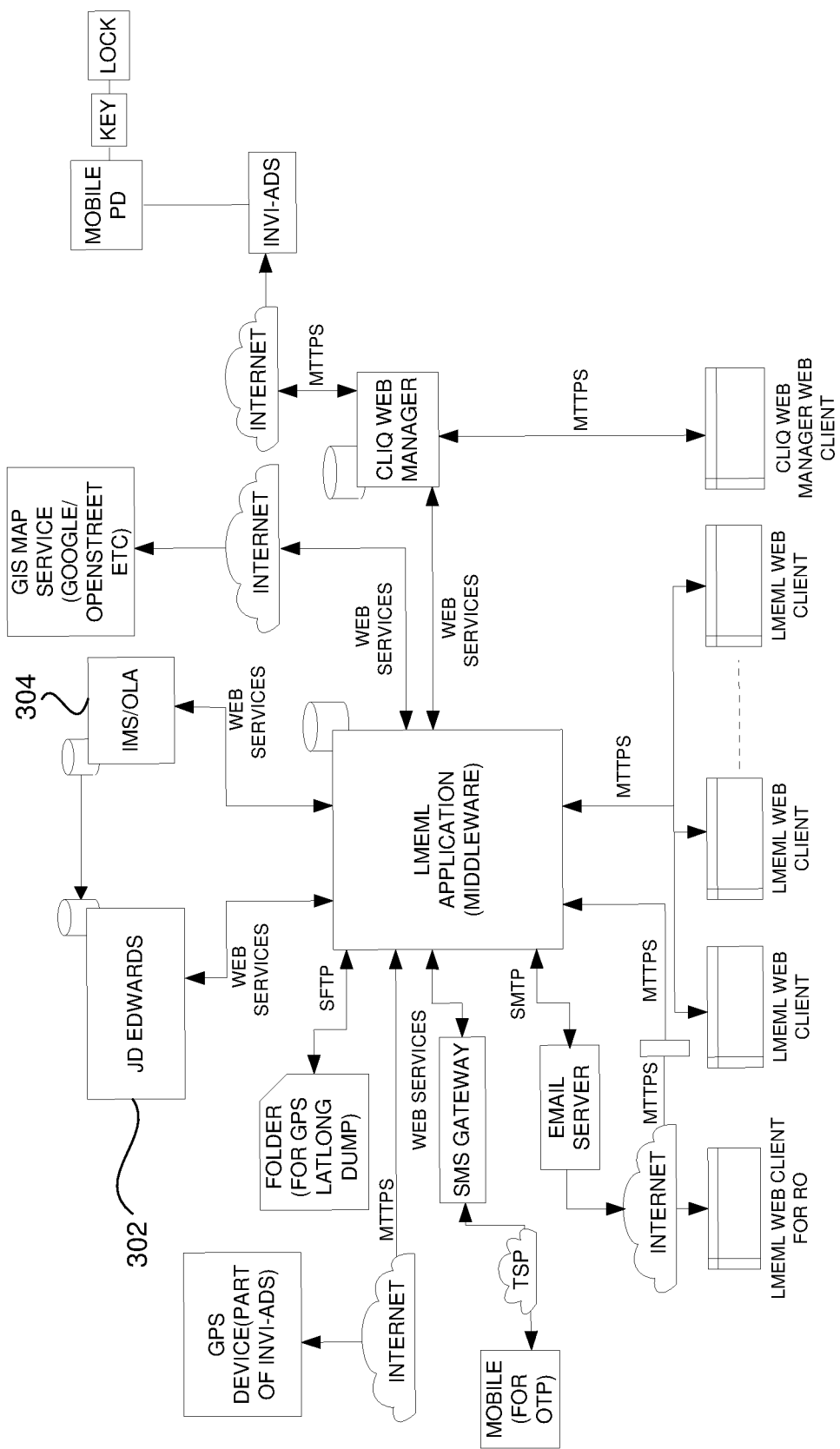
FIG. 3 is a system of a system that prevents pilferage and tampering of a lock from a vehicle using a JD Edwards (JDE)/Information Management System (IMS) according to an embodiment herein.

FIG. 3 is a system of a system that prevents pilferage and tampering of a lock from a vehicle 112 using a JD Edwards (JDE)/Information Management System (IMS) according to an embodiment herein. The system includes JD Edwards (JDE) 302 and Information Management System (IMS) 304. In an embodiment, the system maintains the at least one EMPL 116 for the vehicle 112 to enable deliveries of part loads whenever required. The at least one EMPL 116 for the vehicle 112 may be used for the deliveries of the part loads based on (a) the destination of the vehicle 112, (b) the time period within which the vehicle 112 needs to reach the destination, (c) the authorized route at which the vehicle 112 needs to travel to reach the destination and (c) the onetime password to unlock the at least one EMPL 116 for the vehicle 112 when information related to the TTLS application server 108 identifies the part loads using the JDE 302 and IMS 304. The JDE 302 may be an interface between Oracle application and the pilferage preventing system. The pilferage preventing system sends the web queries corresponding to information to the JDE 302. The JDE 302 receives and executes the web queries when the pilferage preventing system requires the information. The IMS 304 may be a part of the central time server 110 which stores information about the vehicle 112 reaches the origin (for example, the tanker truck reaches the place where the tanker truck fills oil).

Figure 4:
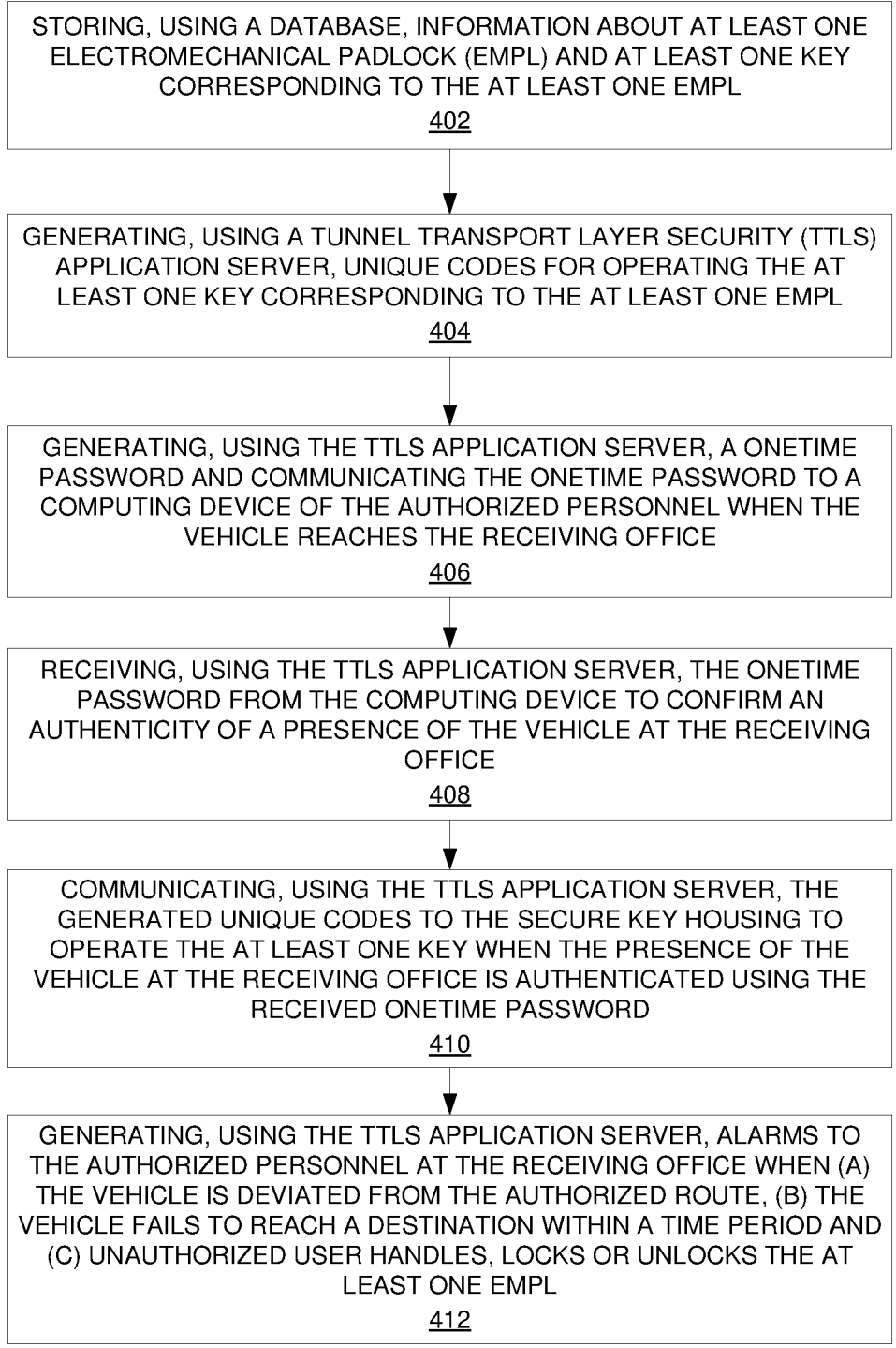
FIG. 4 is a flow diagram illustrating a method for preventing pilferage and tampering of a lock from a vehicle using a system of FIG. 1 according to an embodiment herein.

FIG. 4 is a flow diagram illustrating a method for preventing pilferage and tampering of a lock from a vehicle using a system of FIG. 1 according to an embodiment herein. At step 402, information about at least one EMPL 116 and at least one key corresponding to the at least one EMPL 116 is stored in a database 202 of a TTLS application server 108. In an embodiment, the vehicle information including a destination of the vehicle 112, an authorized route at which the vehicle 112 needs to travel to reach the destination, a time period within which the vehicle 112 needs to reach the destination and details of authorized personnel (i.e. the user) 102 of a receiving office at the destination are stored in the database 202 of the TTLS application server 108. At step 404, unique codes are generated for operating the at least one key corresponding to the at least one EMPL 116 using the TTLS application server 108. In an embodiment, the at least one key is programmed using a wall programming device (WPD) that is installed inside a secure key housing 114 when a group of EMPL's 116 and a group of keys are authorized by the TTLS application server 108. At step 406, a onetime password is generated using the TTLS application server 108 and communicated to the computing device 104 of the authorized personnel 102 when the vehicle 112 reaches the receiving office. At step 408, the onetime password is received from the computing device 104 at the TTLS application server 108 to confirm an authenticity of a presence of the vehicle 112 at the receiving office. At step 410, the generated unique codes are communicated from the TTLS application server 108 to the secure key housing 114 to operate the at least one key when the presence of the vehicle 112 at the receiving office is authenticated using the received onetime password. At step 412, alarms are generated using the TTLS application server 108 to the authorized personnel 102 at the receiving office when (a) the vehicle 112 is deviated from the authorized route, (b) the vehicle 112 fails to reach the destination within the time period and (c) an unauthorized user handles, locks or unlocks the at least one EMPL 116.

Figure 5:
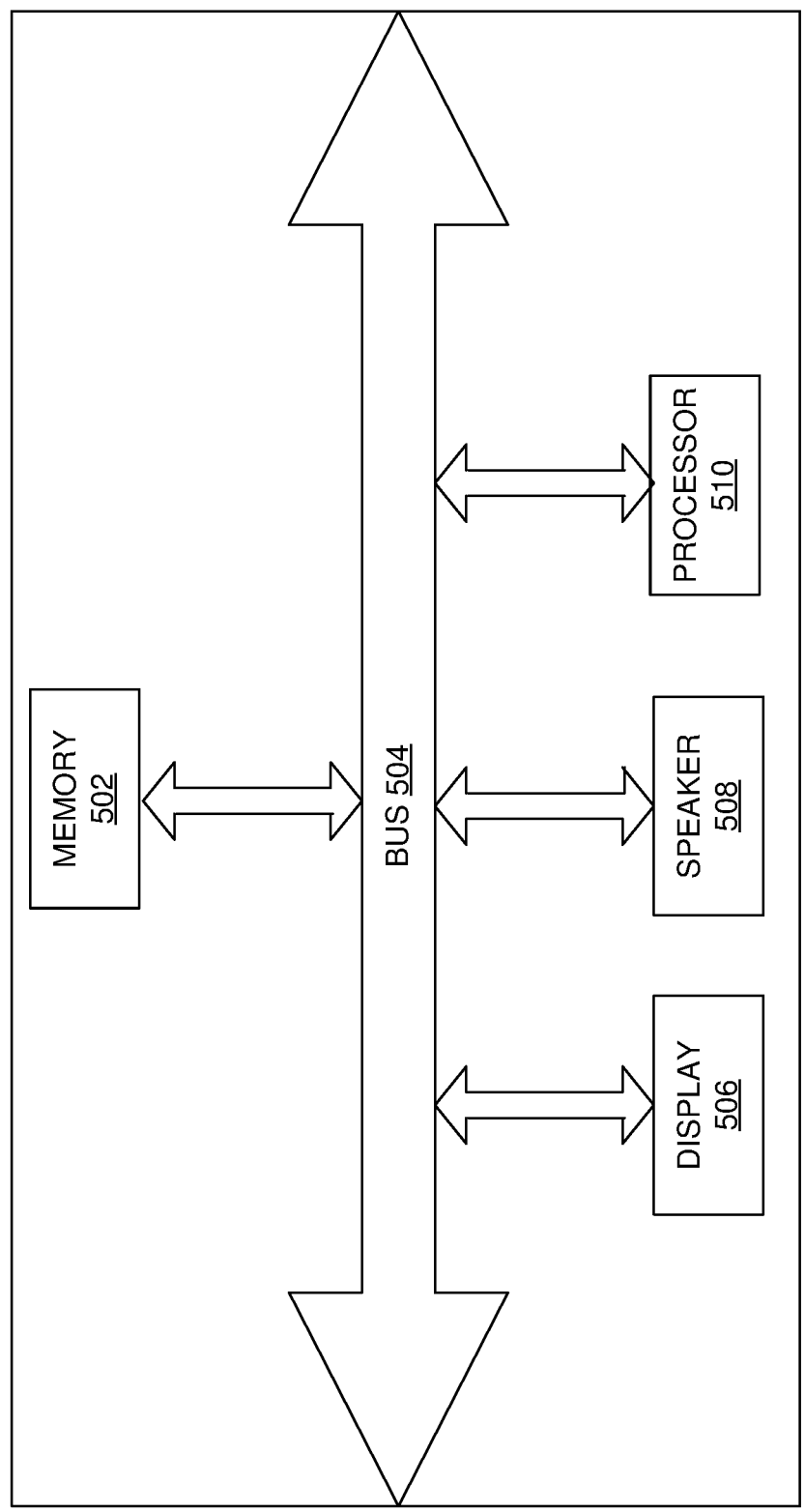
FIG. 5 illustrates an exploded view of a receiver of FIG. 1 according to an embodiment herein.

FIG. 5 illustrates an exploded view of a receiver 500 of FIG. 1 having a memory 502 having a set of instructions, a bus 504, a display 506, a speaker 508, and a processor 510 capable of processing the set of instructions to perform any one or more of the methodologies herein, according to an embodiment herein. The processor 510 may also enable digital content to be consumed in the form of video for output via one or more displays 506 or audio for output via speaker and/or earphones 508. The processor 510 may also carry out the methods described herein and in accordance with the embodiments herein.

Digital content may also be stored in the memory 502 for future processing or consumption. The memory 502 may also store program specific information and/or service information (PSI/SI), including information about digital content (e.g. the detected information bits) available in the future or stored from the past. A user of the receiver 500 may view this stored information on display 506 and select an item of for viewing, listening, or other uses via input, which may take the form of keypad, scroll, or other input device(s) or combinations thereof. When digital content is selected, the processor 510 may pass information. The content and PSI/SI may be passed among functions within the receiver 500 using the bus 504.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk— read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
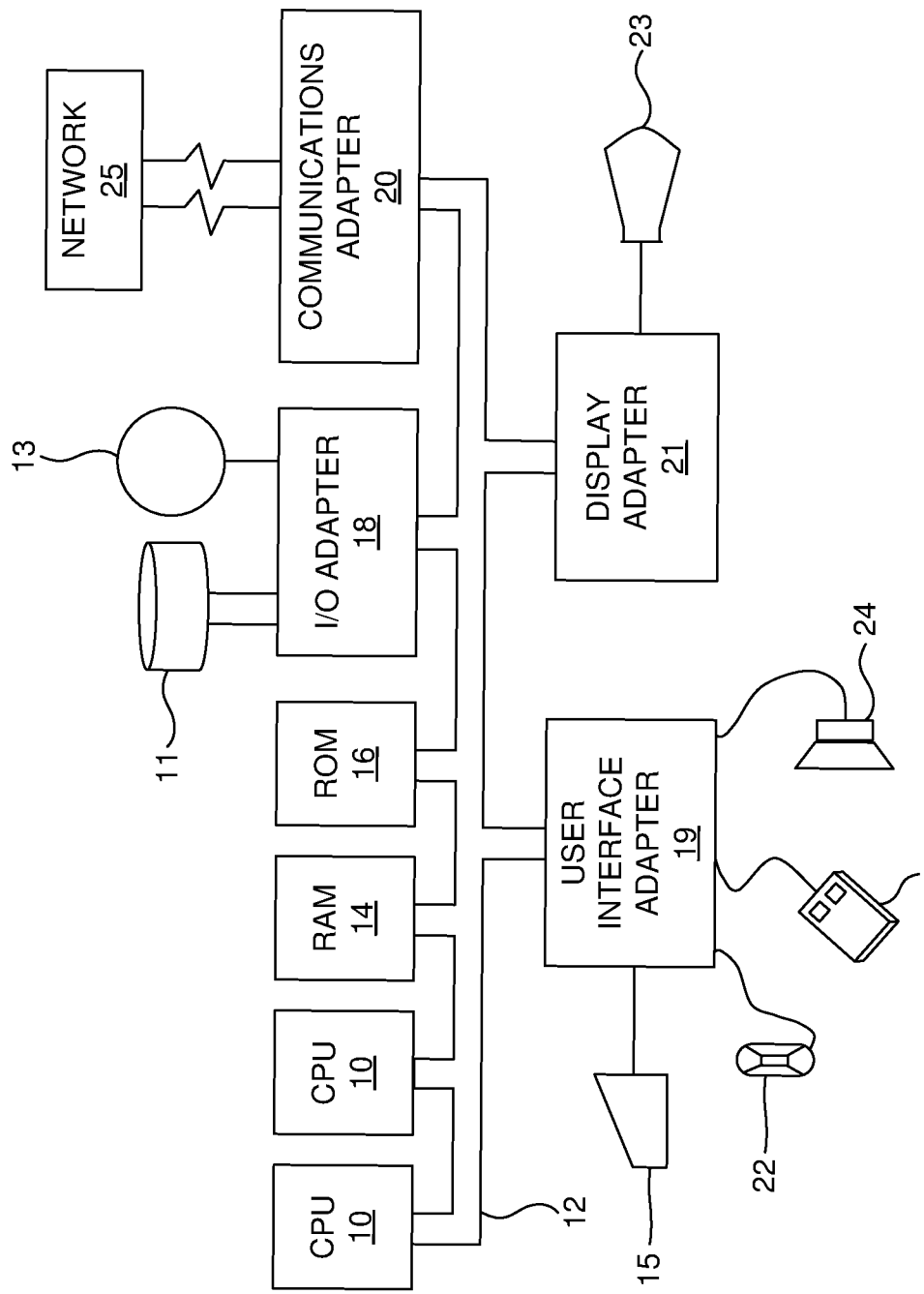
FIG. 6 illustrates a schematic diagram of computer architecture of a computing device or a TTLS application server, in accordance with the embodiments herein

A representative hardware environment for practicing the embodiments herein is depicted in FIG. 6. This schematic drawing illustrates a hardware configuration of the computing device 104 or the TTLS application server 108 in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

I claim:

1. A system for preventing pilferage and tampering of a lock from a vehicle, comprising:
    at least one electromechanical padlock (EMPL) that is adapted to attach to a container of a vehicle to lock or unlock the container of the vehicle;
    a secure key housing that comprises at least one key to lock or unlock the at least one EMPL, wherein the secure key housing is mounted on a crew cabin of the vehicle, wherein the secure key housing comprises an electromagnetic lock that locks or unlocks the secure key housing;
    a tunnel transport layer security (TTLS) application server that is communicatively coupled to the secure key housing, wherein TTLS application server comprises a memory that comprises a database, wherein the database stores information about the at least one EMPL and the at least one key corresponding to the at least one EMPL, wherein the database further stores vehicle information that comprises a destination of the vehicle, an authorized route at which the vehicle needs to travel to reach the destination, a time period within which the vehicle needs to reach the destination and details of authorized personnel of a receiving office at the destination; and
    a processor that is configured to generate unique codes for operating the at least one key corresponding to the at least one EMPL;
    generate a onetime password and communicate the onetime password to a computing device of the authorized personnel when the vehicle reaches the receiving office;
    receive the onetime password from the computing device to confirm an authenticity of a presence of the vehicle at the receiving office;
    communicate the generated unique codes to the secure key housing to unlock the electromagnetic lock and permit access to the secure key housing for operation of the at least one key in response to the presence of the vehicle at the receiving office being authenticated by the reception of the onetime password from the authorized personnel and generating alarms to the authorized personnel at the receiving office if (a) the vehicle the vehicle fails to reach the destination within the time period and (c) an unauthorized user handles, locks or unlocks the at least one EMPL.

2. The system as claimed in claim 1, wherein the TTLS application server is configured to communicate the unique codes for locking and unlocking of the at least one EMPL in an emergency situation based on (a) the destination of the vehicle, (b) the time period within which the vehicle needs to reach the destination, (c) the authorized route at which the vehicle needs to travel to reach the destination and (d) the onetime password to unlock the at least one EMPL lock for the vehicle over-ridden through a permission based workflow.

3. The system as claimed in claim 1, wherein the at least one EMPL and the at least one key comprise an embedded clock function to synchronize events selected from at least one of unauthorized handling, unlocking or locking of the at least one EMPL with the TTLS application server, wherein the TTLS application server synchronizes the events using a Network Time Protocol (NTP) of a central time server.

4. The system as claimed in claim 3, wherein the TTLS application server is configured to monitor the events associated with the at least one EMPL and the at least one key.

5. The system as claimed in claim 1, wherein the at least one key in the secure key housing are dynamically programmed during at least one of emergency situations or exception handling scenarios, wherein the at least one key is programmed at a data center or a programming device at the receiving office.

6. A method for preventing pilferage and tampering of a lock from a vehicle, comprising:
    storing, using a database, information about at least one electromechanical padlock (EMPL) that is adapted to be attached to a container of the vehicle, wherein the database further stores vehicle information comprises a destination of the vehicle, an authorized route at which the vehicle needs to travel to reach the destination, a time period within which the vehicle needs to reach the destination and details of authorized personnel of a receiving office at the destination;
    providing, to the vehicle, a secure key housing that comprises at least one key to lock or unlock the at least one EMPL, wherein the secure key housing is mounted on a crew cabin of the vehicle, wherein the secure key housing comprises an electromagnetic lock that locks or unlocks the secure key housing;
    generating, using a tunnel transport layer security (TTLS) application server, unique codes for operating the at least one key corresponding to the at least one EMPL;
    generating, using the TTLS application server, a onetime password and communicating the onetime password to a computing device of the authorized personnel when the vehicle reaches the receiving office;

receiving, using the TTLS application server, the onetime password from the computing device to confirm an authenticity of a presence of the vehicle at the receiving office;

communicating, using the TTLS application server, the generated unique codes to the secure key housing to unlock the electromagnetic lock and permit access to the secure key housing for operation of the at least one key in response to the presence of the vehicle at the receiving office being authenticated by the reception of the onetime password from the authorized personnel and generating alarms to the authorized personnel at the receiving office if (a) the vehicle the vehicle fails to reach the destination within the time period and (c) an unauthorized user handles, locks or unlocks the at least one EMPL.

7. The method as claimed in claim 6, comprising communicating, using the TTLS application server, the unique codes for locking and unlocking of the at least one EMPL in an emergency situation based on (a) the destination of the vehicle, (b) the time period within which the vehicle needs to reach the destination, (c) the authorized route at which the vehicle needs to travel to reach the destination and (c) the onetime password to unlock the at least one EMPL for the vehicle over-ridden through a permission based workflow.

8. The method as claimed in claim 6, wherein the at least one EMPL and the at least one key comprise an embedded clock function to synchronize events selected from at least one of unauthorized handling, unlocking or locking of the at least one EMPL with the TTLS application server, wherein the TTLS application server synchronizes the events using a Network Time Protocol (NTP) of a central time server.

9. The method as claimed in claim 8, comprising monitoring, using the TTLS application server the events associated with the at least one EMPL and the at least one key.

* * * * *